US005625608A

United States Patent [19]
Grewe et al.

[11] Patent Number: 5,625,608
[45] Date of Patent: Apr. 29, 1997

[54] REMOTE CONTROL DEVICE CAPABLE OF DOWNLOADING CONTENT INFORMATION FROM AN AUDIO SYSTEM

[75] Inventors: Anthony J. Grewe, Holmdel; Kevin A. Shelby, Red Bank; Howard M. Singer, Marlboro, all of N.J.

[73] Assignee: Lucent Technologies Inc., Murray Hill, N.J.

[21] Appl. No.: 447,336

[22] Filed: May 22, 1995

[51] Int. Cl.$^6$ ............................ G11B 19/00; G08C 19/00
[52] U.S. Cl. ................ 369/24; 340/825.24; 340/825.72
[58] Field of Search .................. 369/24, 29; 340/825.72, 340/825.15, 825.24, 825.71, 870.16; 381/30, 29, 105, 104

[56] References Cited

U.S. PATENT DOCUMENTS

| | | | |
|---|---|---|---|
| 4,119,948 | 10/1978 | Ward et al. | 340/151 |
| 4,551,714 | 11/1985 | Giammarese | 340/825.72 |
| 4,825,209 | 4/1989 | Sasaki et al. | 340/825.72 |
| 4,864,550 | 9/1989 | Kawanaka | 369/24 |
| 5,257,254 | 10/1993 | Kutaragi | 369/1 |
| 5,272,477 | 12/1993 | Tashima et al. | 340/825.72 |
| 5,410,326 | 4/1995 | Goldstein | 340/825.72 |
| 5,465,240 | 11/1995 | Mankovitz | 369/1 |

*Primary Examiner*—Tan Dinh

[57] ABSTRACT

A remote control unit for use with an in-home audio player adapted to play pre-recorded music stored on a semiconductor music chip storage medium. In accordance with one preferred embodiment of the invention, the remote unit is a battery powered, hand held device which enables customized music selection to be made at the audio player from a distant position. The remote control unit includes an LCD display, a series of control buttons and an infrared communication interface for transmitting and receiving data from the audio player. A docking port is included in the audio player for mating with the remote control in order to download general information stored in memory of the audio player regarding each of the music chips which it has loaded. A processor within the remote control guides the user through a menu driven software routine for making music selection at the player. A user scrolls through the various menus by use of a navigation pointer. Soft keys on the remote take on different functions depending on the location within the menu driven software routine. For example, a user can choose to play individual music tracks according to a category of music, musical artist or specific song. Other functions of the remote include play, pause, scan (forward and reverse) and fast scan, as well as On/Off and volume control.

20 Claims, 4 Drawing Sheets

REMOTE CONTROL DEVICE CAPABLE OF DOWNLOADING CONTENT INFORMATION FROM AN AUDIO SYSTEM

RELATED APPLICATIONS

The present patent application is related to U.S. patent application Ser. No. 08/447,322, entitled Smart Tray For Audio Player, and having a filing date of May 22,1995, that application having common inventors and assignee and being incorporated herein by reference.

FIELD OF THE INVENTION

The present invention relates to a remote control unit for an in-home audio player, and more particularly to a remote control unit having a docking arrangement with the audio player for downloading of information to the remote control.

BACKGROUND OF THE INVENTION

The prior art is replete with various remote control units adapted to communicate with a host of different control devices including televisions, VCRs and audio equipment. Depending on the application for the remote control unit, common functional capabilities may include On/Off, volume control, and selection control, e.g., channel or music track selection, fast forward, rewind, scan, etc. With regard to remote control of audio equipment, it is many times desirable to have the ability to make content related selections from a music collection stored in a jukebox type device. Such a device may, for example, take the form of a compact disc (CD ROM) player having multiple disc storage capability.

Compact discs and other recording mediums, however, have some significant disadvantages in regard to the remote access of content information. For one, current recording technologies do not normally include the ability to register the content of the information stored thereon prior to selection at the player. In other words, in order to gain any information regarding the contents of a particular music selection, that selection will first have to be manually selected at the player or by remote. In the alternative, some music players may be manually programmed to play certain selections based upon user input wherein the selections can then be remotely activated.

In either circumstance, there is no way to automatically search and play music by category, for example, by artist, music type, etc., unless a user has prior knowledge with regard to the selection. Such knowledge must include at a minimum the precise location of a selection on the recording medium, a way in which to direct the player apparatus to that location, and a searchable index keyed to the selection and the locations. Largely because of limitations in the recording media, many of these functions cannot be accomplished cost effectively or efficiently at the player, and certainly not from a remote control.

An emerging technological innovation for the recording of consumer directed audio is the storage of pre-recorded audio on a medium known as semiconductor music chips. Digital data stored on the music chips is accessed by means of a solid state audio player having a digital signal processor which converts the stored digital data into audio signals. Up until recently the storage of digital data for reproduction of popular music albums on a single semiconductor chip was not viable because of the amount of memory needed and the costs associated with same. As data compression techniques have further developed, however, the storage of full length albums on modestly sized semiconductor chips has become a reality. The storage of music selections on semiconductor music chips allows for greater flexibility as to the type of information that can be stored and also in the manner in which such information is accessed. For example, content information by way of music category and artist may be stored within the semiconductor music chips and then accessed at the player so that general music selections can be made without prior knowledge by a user. The ability to perform remote selections based on general content information greatly enhances the attractiveness of a solid state music system using the semiconductor chip music storage medium.

It is therefore an object of the present invention, to provide a remote control unit for an audio system wherein general content and selection information from the recording medium are readily available for remote selection by a user. It is further an object of the present invention to provide a remote control unit wherein the selection information available at the remote is easily updated.

SUMMARY OF THE INVENTION

The present invention is a remote control unit for use with an in-home audio player. The audio player is adapted to play pre-recorded music stored on a semiconductor music chip storage medium. In accordance with one preferred embodiment of the invention, the remote unit is a battery powered, hand held device which enables customized music selections to be made at the audio player from a distant position. Typical range of the remote is comparable to that of standard commercial television remotes. The remote control unit includes an LCD display, a series of control buttons and an infrared communications interface for transmitting to and receiving data from the audio player. A docking port is included in the audio player for mating with the remote control in order to download general content information stored in memory of the audio player in regard to each of the music chips which it has loaded. The download procedure is initiated by one or more predetermined button presses on either the remote or player, and the information is transmitted over an interface utilizing infrared energy.

A processor within the remote control guides the user through a menu driven software routine for making music selections at the player. A user scrolls through the various menus by use of a navigation pointer. Soft keys on the remote take on different functions depending on the location within the menu driven software routine. For example, a user can choose to play individual music tracks according to a category of music, musical artist or specific song. Other functions of the remote include play, pause, scan (forward and reverse) and fast scan, as well as ON/OFF and volume control.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

Figure 1:
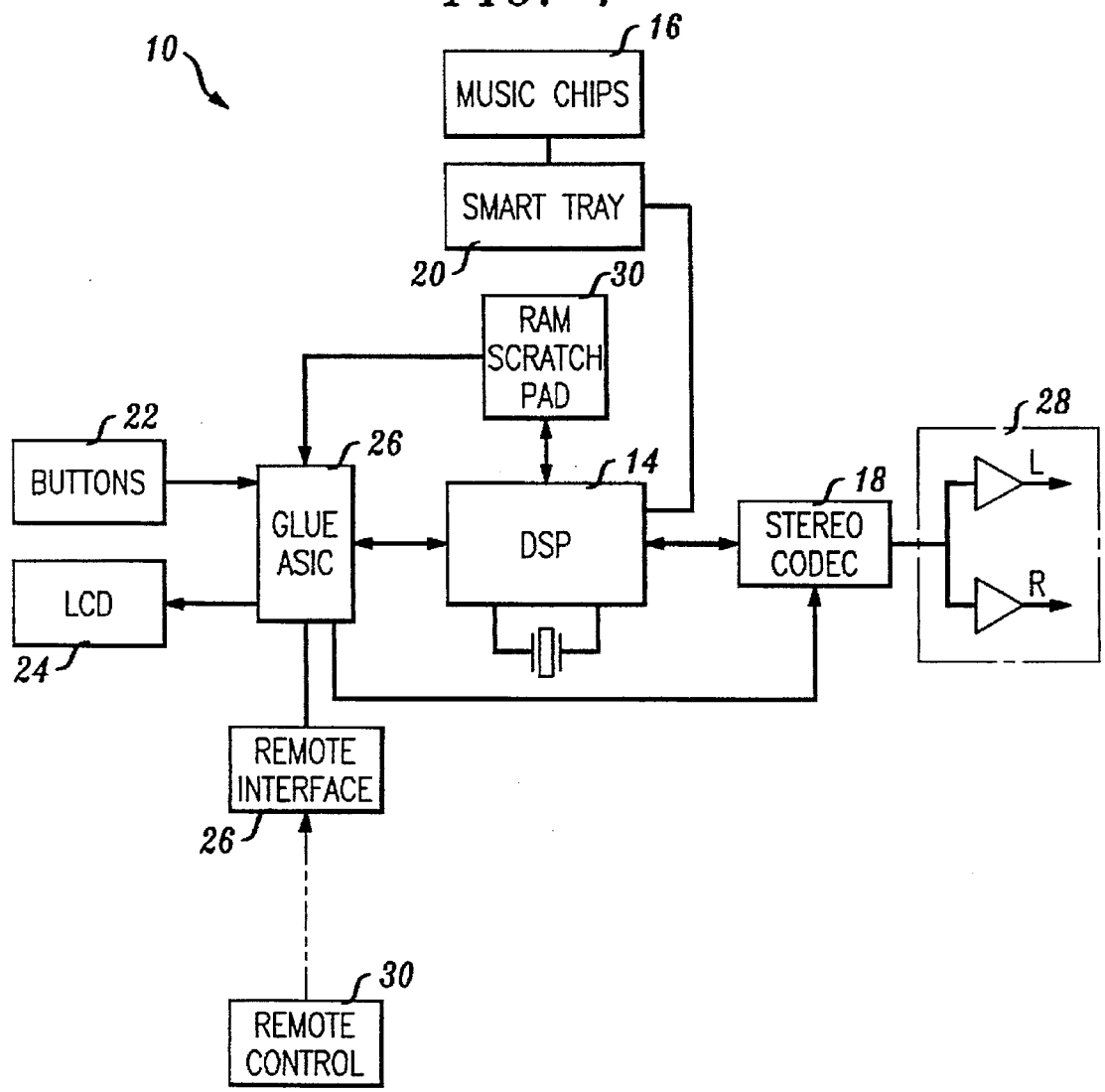
FIG. 1 shows a block diagram for one preferred embodiment of a solid state audio player used in conjunction with the present invention remote control.

The present invention is a remote control unit used with a solid state audio system that plays music recorded on a semiconductor music chip recording medium. Referring to FIG. 1, there is shown a block diagram of one preferred embodiment of a solid state audio system 10 which utilizes the present invention remote control 30. One or more music chips 16 are coupled to an audio player 12 by means of a music storage tray 20. The audio player 12 is operated by means of a digital signal processor (DSP) 14 which communicates through the music tray 20 in order to access information from the music chips.

Besides the DSP 14 and music tray 20, a stereo coder/decoder (codec) 18, keypad 22, display 24, and remote control interface 26 are included as part of the main hardware architecture of the audio player. The remote control unit 30 communicates to the audio player 12 by means of the remote control interface 26. The keypad, display and remote interface are coupled to associated interface logic in the form of an applications specific integrated circuit (ASIC) 27 and comprise the user interface which allows for the making of custom music selections. The audio player 12 is responsible for decoding a bit stream read from a selected music chip 16 and outputting the music through an output device, such as speakers or headphones 28.

The music chips 16 used with the audio player 12 are essentially memory devices having digital data stored thereon which corresponds to pre-recorded music. The pre-recorded audio data is stored on the chip 16 in a compressed format by means of an audio coding algorithm. The algorithm reduces the amount of digital information necessary to be stored from a master recording, while still reproducing essentially the same audio quality when the data is read back. Encoding by means of the algorithm is necessary in order to store sufficient quantities of data so that the music on the chips 16 may have times of play comparable to that of current day albums. Other information pertaining to the musical content of the chip, including a music category, artist and specific addressing information, is stored in a series of headers which are downloaded to the audio player once the chip is loaded. For a more detailed explanation of the data storage protocol associated with the music chips, see related U.S. patent application Ser. No. 08/447,321, entitled Data Protocol for a Music Chip and assigned to the present assignee herein.

Figure 2:
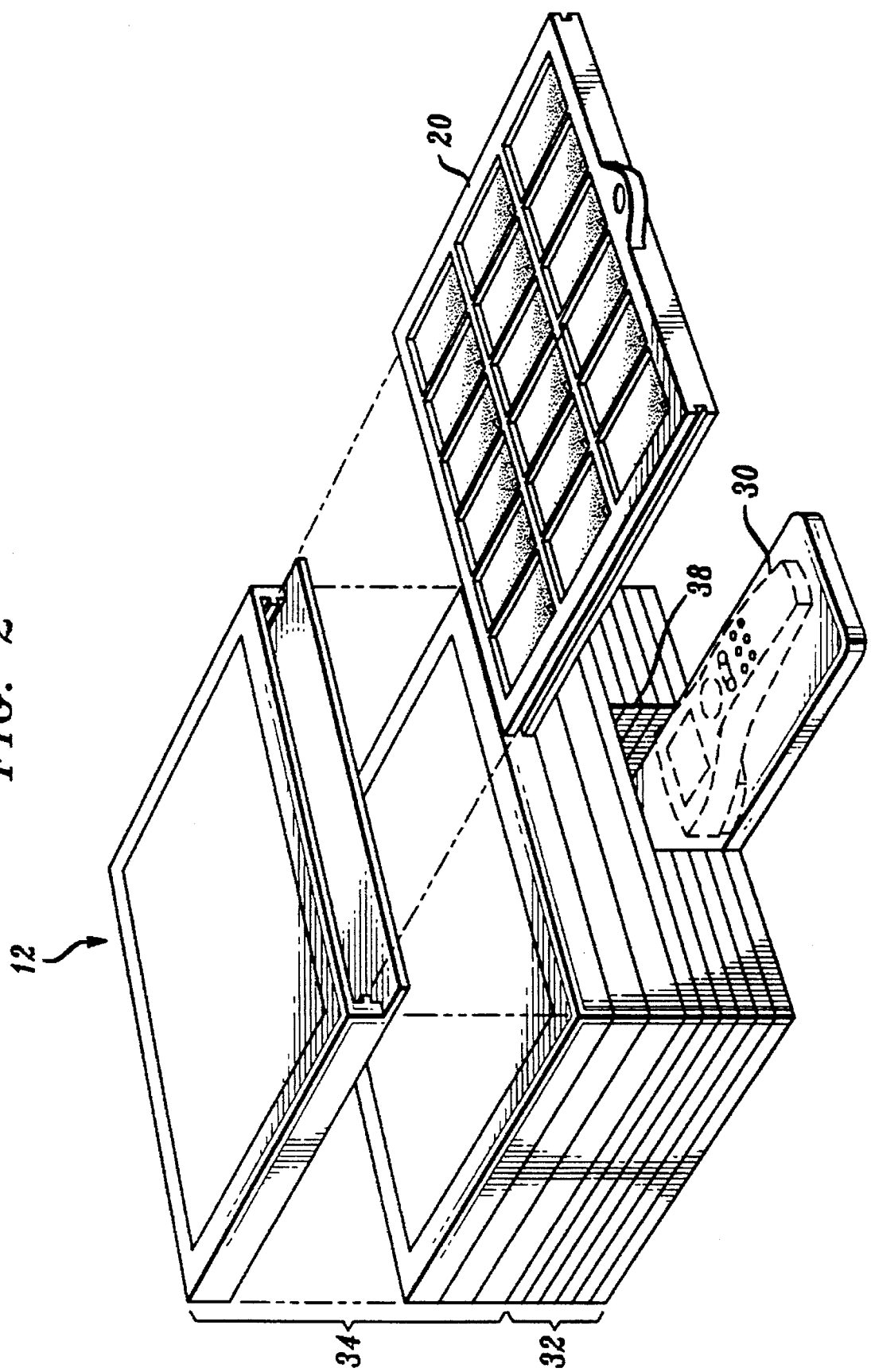
FIG. 2 shows one preferred embodiment of a solid state in-home audio player shown in conjunction with the present invention remote control.

Referring to FIG. 2 in connection with FIG. 1, there is shown an exemplary embodiment of the audio player 12, which utilizes the present invention remote control unit 30. The player 12 is a semi-stationary device for home/commercial use and is intended to blend and connect with a user's current entertainment system. The player 12 includes a base portion 32 and a tiered upper portion 34 which includes the music trays 20. The base portion houses the DSP 14, the codec 18, and associated logic for interfacing with the user. The remote control unit 30 is included with the system as part of the user interface for performing user functions at a distance. A docking port 38 adapted to receive the remote control unit 30 is included in the base, wherein music selection information is downloaded to the remote in order that the user may perform intelligent selections. In a preferred embodiment of the invention the remote control interface 26 located within the docking port utilizes an infrared communications scheme wherein information is transmitted optically to and from the remote through the remote interface. It will be understood, however, that a plug-in docking arrangement may also be utilized, wherein the remote and audio player make physical contact in order to accomplish the downloading.

Figure 3:
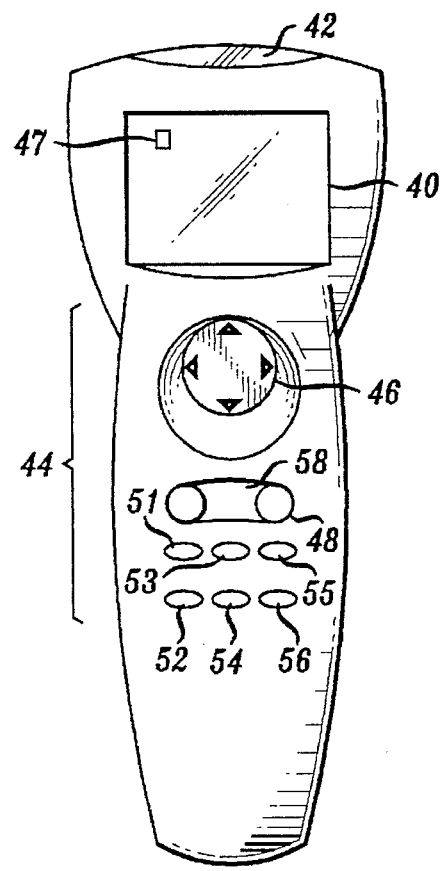
FIG. 3 shows a top plan view of the present invention audio player remote control.

Referring to FIG. 3, there is shown one preferred embodiment for the present invention remote control device 30. Included within the remote is an LCD display 40, a communications interface portion 42 and a series of selection buttons 44. The selection buttons include but are not limited to a navigation pointer 46, volume/power control combination button 48 and a set of "soft" function keys 51–56. The navigation pointer 46 controls a cursor 47 which appears on the LCD display 40, wherein cursor movement takes place in at least four different directions corresponding to the indicators on the pointer. Multi-directional, i.e., diagonal, movement may also be available depending on the firmware routine utilized in the remote 30. The function of the navigational pointer 46 is similar to that of a joystick mechanism or mouse, wherein a portion of the display may be selected after movement of the cursor 47 thereto.

The volume/power control is implemented using a combination switch 48 capable of three separate outputs. In one preferred application, depressing the combination switch 48 on one side of the switch corresponds to a decrease in volume while depression of the switch on the opposite side produces an increase in volume. Depressing the combination switch 48 in a center region 58 thereof produces a contact closure on both sides of the switch to provide a third output which turns the audio player On and Off. A more detailed explanation of the combination switch mechanism in included in related U.S. patent application Ser. No. 08/447, 328, entitled Button Interface For A State Machine.

Figure 4:
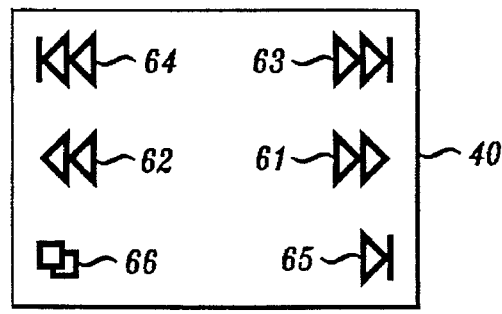
FIG. 4 shows one example of a software screen display for the present invention remote wherein the navigation pointer may be used to scroll therethrough.

The soft function keys 51–56 are used to choose various functions encoded in the menu driven software of the remote. The individual keys will take on different functions depending on the menu status of the LCD display 40. FIG. 4 illustrates an exemplary usage of the soft keys 51–56 wherein the LCD 40 displays six commonly used remote commands. Icons 61–66 representative of each of the commands, i.e., forward 61, reverse 62, fast forward 63, fast reverse 64, play 65 and pause 66, are shown on the display 40 and an individual soft key 51–56 corresponds to each of the commands. Depression of a soft key acts to execute the appropriate selection.

Figure 5:
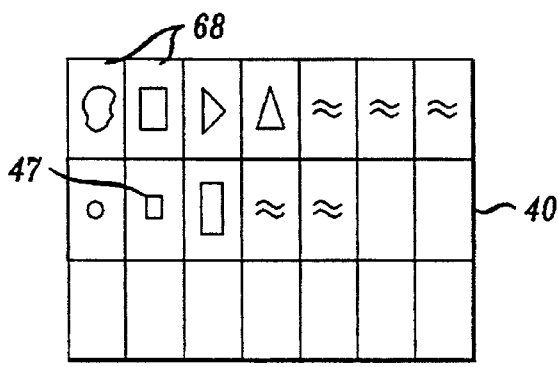
FIG. 5 shows a second example screen display illustrating use of the soft key functions.

FIG. 5 shows an exemplary display screen wherein the navigational pointer would be advantageously utilized. A matrix is represented on the display 40 which corresponds to the music chips included on a single music storage tray. Textual and/or graphical representations 68 are included for each of the chips loaded into a tray 20. The navigational pointer 46 is used to manipulate the cursor 47 to a desired selection within the matrix. The selection may be carried out, for example, by clicking or depressing the pointer 46 for execution of the selection, similar to the manner in which buttons on a mouse peripheral are "clicked". The selection command will either move the user to the next level of the menu display program within the remote 30 or fully execute the selection. In the alternative to information being displayed in matrix form, it will be understood that information will be displayed in tabular form wherein a user scrolls through the display utilizing the pointer 46. In addition, it will be understood, that the button layout presented with respect to FIG. 3 is merely exemplary and that a person skilled in the art may choose other configurations to accomplish similar functionality.

As discussed with respect to FIG. 2, content information from the music player is downloaded to the remote control unit 30 when the remote is docked within the docking port 38 of the audio player 12. A button or command sequence is entered on the base of the audio player 12 in order to initiate the downloading process. As an alternative, one or more keys on the remote unit could also be utilized to initiate the download procedure.

Figure 6:
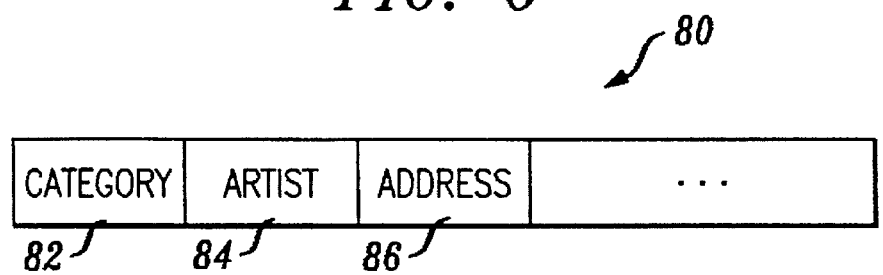
FIG. 6 shows an exemplary representation of an individual header stored within music chip.

Content information which is downloaded to the remote is stored in the individual music chips 16 in a series of headers. Each music chip that is inserted into the audio player will have a section of memory allocated to a table of contents. Track selections on the chip will be listed as play of this table of contents by individual headers. The table of contents will include information on play times song titles, music category and artist. Providing this information allows the chip 16 to self-register when it is loaded into a storage tray 20 of the audio player 12 so that a user need not first access individual chips to gain content information. Referring to FIG. 6, there is shown one preferred embodiment of an individual header 80 which will correspond to a single track on one of the music chips 16. The individual header contains a music category 82 to which the track belongs, for example, classical, jazz, country, rock, etc. Also included in the individual header 80 is an artist field 84 for indication of the artist and addressing information 86 detailing start and end addresses for each track selection. Individual header information is self-registered with RAM on the audio player once a chip 16 is inserted and powered up.

The individual header concept allows a user to maker music selections by category of music or artist which lends greater overall flexibility to the system. For example, a user may select to randomly hear Country Western songs over the course of an evening, or to hear songs from a specific artist, for example, Billy Joel. Music play may be performed randomly, sequentially, or by specific content as requested by the user. This header information is downloaded from the music chips into the audio player, for example, into memory associated with each of the individual storage trays. This same information, or information corresponding thereto is then transferred to the remote upon docking and execution of appropriate download commands. Transfer of the content selection information enables a user to make intelligent selections at the remote in regard to general or specific content without having to view the display on the audio player.

Figure 7:
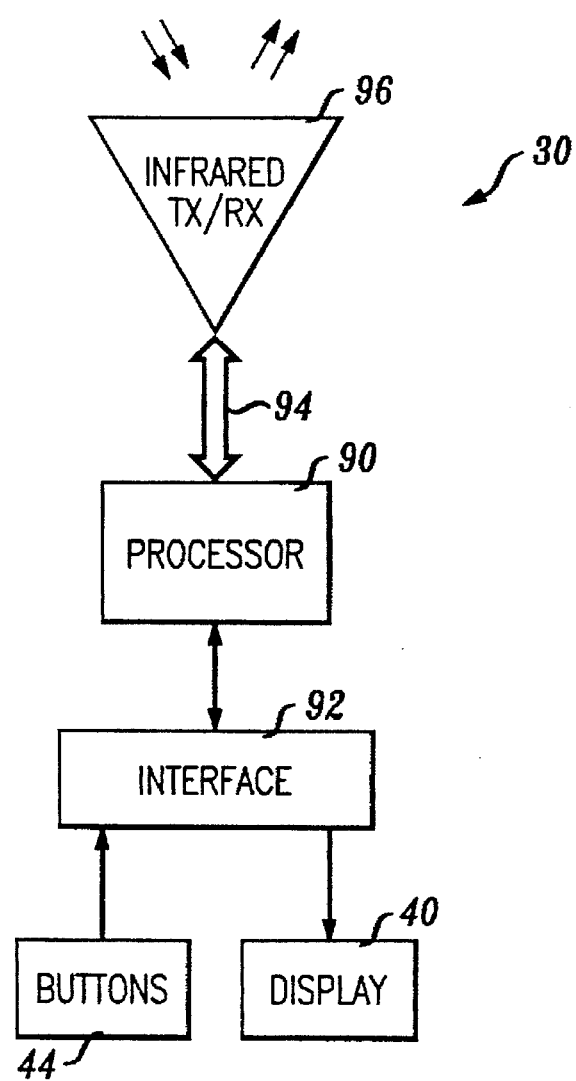
FIG. 7 shows a block diagram for one preferred embodiment of the present invention remote control unit.

Referring to FIG. 7 in connection with FIG. 1, there is shown a block diagram of one preferred embodiment for the present invention remote control unit 30. As described with respect to FIG. 3, the remote includes the LCD 40 and buttons 44 for input of user commands. The LCD and Buttons are coupled to a processor 90 by means of a logic interface 92. A bi-directional bus 94 is coupled from the processor 90 to an infrared transmit/receive circuit 96 in the communications interface 42. The transmit/receive circuit 96 is adapted to convert a digital bit stream from the remote 30 and transmit corresponding infrared energy in a known manner and at a frequency receivable by that of the remote interface 26 of the audio player 12. The remote interface receives the infrared energy and reconverts the information to digital form where it is handled by the processor 14 of the audio player 12. In a similar fashion the transmit/receive circuit 96 receives infrared communications from the audio player when the remote 30 is docked. This information is convened and processed digitally by the remote. The infrared transmission scheme is advantageous because of the relatively low power consumption required for transmissions. As will be understood, the remote control 30 is powered utilizing standard sized commercially available batteries. A firmware routine stored in memory of the remote is responsible for implementation of the menu driven selection routines. It will be understood that selection capability of the remote 30 varies according to the selection information which is downloaded during docking.

From the above, it should be understood that the embodiments described, in regard to the drawings, are merely exemplary and that a person skilled in the art may make variations and modifications to the shown embodiments without departing from the spirit and scope of the invention. For example, as an alterative to the two-way infrared transmission scheme shown, the remote control unit may be adapted to physically attach to the audio player in a plug-in arrangement to accomplish downloading. Data will then be transferred between the coupled leads of the audio player and remote. Remote commands, however, will continue to be transmitted using infrared energy. All such variations and modifications are intended to be included within the scope of the invention as defined in the appended claims.

What is claimed is:

1. In an audio system wherein pre-recorded music is digitally encoded in addressable memory of integrated circuit music chips and music from said chips is played on an associated solid state audio player, and wherein general description information regarding individual track selections of said music chips is downloaded to said audio player to assist in making music selections, a remote control apparatus for making remote music selections at said solid state audio player, said remote control apparatus comprising:

transmit/receive means for remotely transmitting to and receiving information from said audio player, said transmit/receive means being adapted to mate with a corresponding transmit/receive means on said audio player, wherein said general description information is downloaded and stored in memory of said remote control apparatus;

selection means for enabling a user to enter commands at said remote control apparatus pertaining to said music selections to be made; and processing means coupled to said transmit/receive means, said selection means and said memory, said processing means being operative to process said user commands and generate a corresponding output signal to said transmit/receive means.

2. The apparatus of claim 1, further including display means coupled to said processing means, wherein said display means enables said user to view said general description information downloaded to said remote control.

3. The apparatus of claim 2, wherein said processing means runs a menu driven selection program and wherein said selection program is viewed from said display means.

4. The apparatus of claim 3, wherein said selection means includes a navigational pointer, said navigational pointer being adapted to selectively maneuver a cursor across said display means to make selections in accordance with said menu driven selection program.

5. The apparatus of claim 1, wherein said transmit/receive means includes an infrared interface means, said infrared interface means being operative to transmit and receive said information to and from said audio player utilizing infrared energy.

6. The apparatus of claim 1, wherein said selection means includes a combination switch, said combination switch being adapted to produce three separate output signals depending on the manner in which said switch is depressed.

7. The apparatus of claim 3, wherein said selection means includes a series of soft control buttons, said soft control buttons corresponding to a selection choice generated on said display means from said menu driven selection program.

8. The apparatus of claim 7, including at least six of said soft control buttons, wherein on a specific display screen, each of said at least six soft control buttons corresponds to a command selected from the group consisting of play, pause, forward scan, reverse scan, fast forward and fast reverse.

9. An improved remote control apparatus for a home audio player, wherein said home audio player is adapted to play pre-recorded music from a storage medium of semiconductor music chips and wherein content information in the form of a series of headers pertaining to individual tracks of audio on said music chips is registered in said audio player, the improvement therewith comprising:

docking station included within said remote, wherein said docking station is adapted to interface in close proximity with a corresponding docking port on said audio player, whereby said content information regarding said individual tracks of audio is downloaded to said remote, thereby facilitating intelligent music selections by a user.

10. The apparatus of claim 9, wherein said docking station includes an infrared transmit/receive circuit for communicating with said audio player by way of infrared energy.

11. The apparatus of claim 9, further including display means for display of said content information downloaded to said remote control.

12. The apparatus of claim 11, further including processing means, wherein said processing means runs a menu driven selection program and wherein said selection program is viewed from said display means.

13. The apparatus of claim 9, further including selection means for enabling a user to enter commands at said remote control apparatus pertaining to music selections which are to be made.

14. The apparatus of claim 12, further a navigational pointer adapted to selectively maneuver a cursor across said display means to make selections in accordance with said menu driven selection program.

15. The apparatus of claim 9, further including a combination switch, said combination switch being adapted to produce three separate output signals depending on the manner in which said switch is depressed.

16. The apparatus of claim 12, including a series of soft control buttons, said soft control buttons corresponding to a selection choice generated on said display means from said menu driven selection program.

17. A method for making remote music selections at an audio player adapted to play music recorded on integrated circuit music chips, wherein content descriptive information pertaining to individual tracks of audio is stored in a series of headers in each of said music chips and said content descriptive information is transferred to said audio player upon enabling said music chips, said audio player further being adapted to dock with a remote control unit for transfer of said content descriptive information thereto, said method comprising the steps of storing said content descriptive information in memory of said audio player;

docking said remote control unit at a docking port of said audio player, whereby said content descriptive information is downloaded and stored within said remote control; and manually entering selection commands at said remote based upon said content descriptive information, wherein said selection commands are remotely communicated to said audio player.

18. The method of claim 17, further including the step of viewing said content descriptive information on a display means on said remote control.

19. The method of claim 18, wherein said content descriptive information is viewed in the context of a menu driven software program.

20. The method of claim 17, wherein said content descriptive information and said command selections are transmitted using infrared energy.

* * * * *